Nov. 10, 1936.    G. HUHN    2,060,374
PACKING FOR THE SHAFTS OF HIGH PRESSURE STEAM TURBINES
Filed Feb. 9, 1935    2 Sheets-Sheet 1
Fig.1.
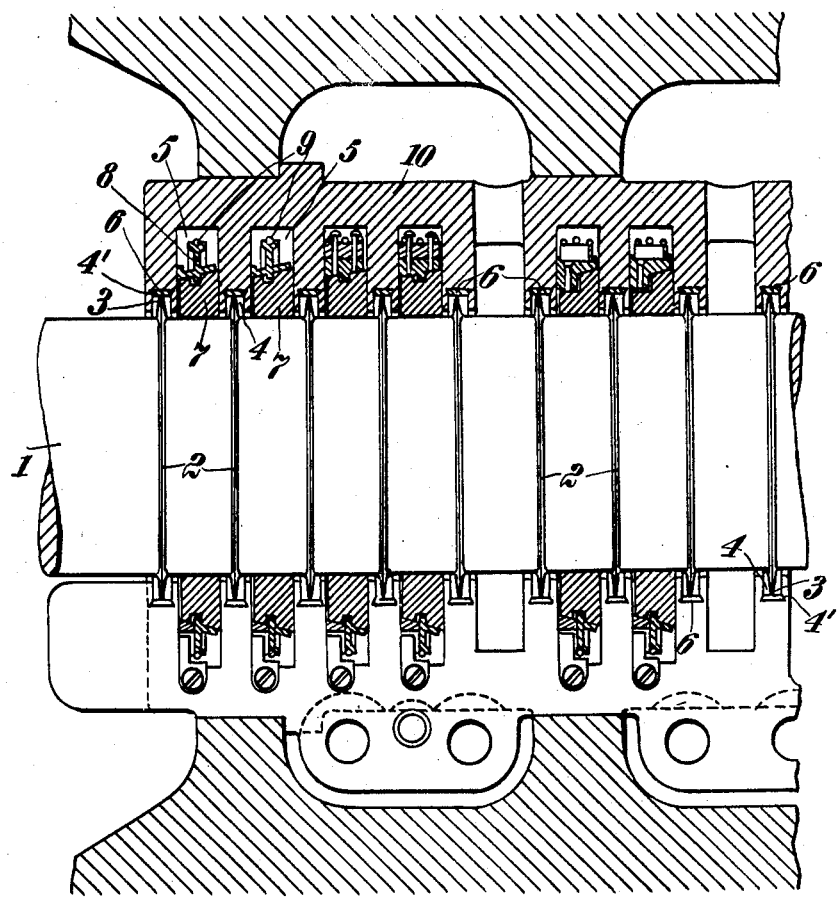
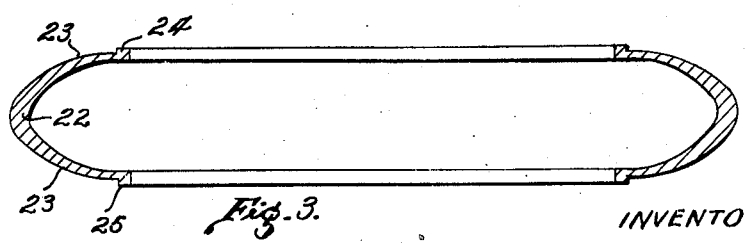
Fig.3.
INVENTOR
GUSTAV HUHN
BY
ATTORNEYS

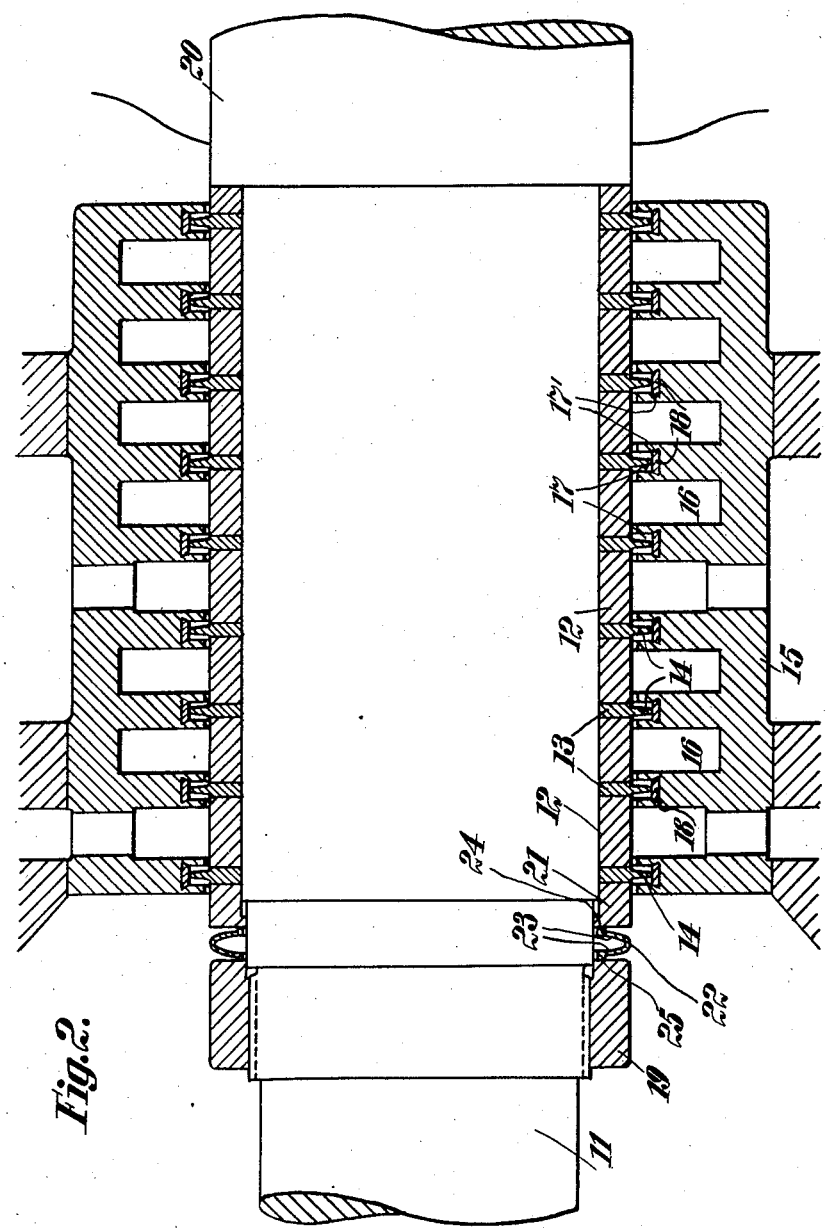

Patented Nov. 10, 1936

2,060,374

UNITED STATES PATENT OFFICE 2,060,374

PACKING FOR THE SHAFTS OF HIGH-PRESSURE STEAM TURBINES

Gustav Huhn, Berlin-Tempelhof, Germany

Application February 9, 1935, Serial No. 5,836
In Germany November 18, 1933

5 Claims. (Cl. 286—10)

For the purpose of packing the shafts of high pressure steam turbines, so-called labyrinth packings are ordinarily used, consisting of a plurality of radially directed metallic strips, encircling the shaft. This packing does not act by contact of the shaft with packing rings, because the metallic strips must not touch the shaft, but acts merely by the loss of pressure to which the steam is subjected during its passage through the narrow multiplex spaces of the labyrinth. For stationary steam turbine plants, operating at a substantially constant working temperature and at a substantially constant steam pressure, it has been found that spring packings, particularly those provided with graphite carbon rings, have fully met all requirements. With these packings the adjustments of a very narrow slit between the inner ring surface and the circumference of the shaft has been rendered possible, because by a slight contact between the graphite carbon rings and the shaft, the former are not subjected to damage.

Neither kind of packing mentioned above, can, however be successfully employed in connection with maximum pressure turbines with varying working temperatures and steam pressures. Maximum pressure turbines of this description are chiefly used for naval purposes, particularly in connection with men-of-war, being so arranged that during a slow so-called cruising run, the stuffing boxes of the turbines are subjected to a pressure of only 1 to 2 atm. in connection with a steam temperature of not more than 150° C., while during a fast run the pressure is raised to about 25 atm. and the temperature to about 450° C. For these high pressures a labyrinth packing can be employed only if the stuffing boxes are of considerable length, not usually available. However, the employment of a carbon packing insures satisfactory results for high pressure and consequent high temperatures, if the gap between the inner surface of the rings and the circumference of the shaft is about equal to the expansion of the shaft at a temperature of about 450° C., but the gap will then be much too wide for a shaft temperature of about 150° C. in view of the fact that the carbon possesses only a low coefficient of heat expansion whereas the shaft and the casing, consisting of steel, expand to a very considerable degree in connection with high temperatures (about $\frac{1}{10}$ mm. per 100 mm. length and 100° C.). Thus, by way of example, with a shaft of 266 mm. and a difference in temperature varying between 450° C. and 150° C. if the gaps be about equal to the shaft expansion at 450° C., they will be equivalent, at the low temperature of the cruising run, (150° C.) to a tube of about 4 square centimeters cross section. The percentage of steam lost during a cruising run would consequently be excessive.

The object of the present invention is to provide an improved packing for high pressure turbines with varying temperatures and steam pressures, which will fully meet all requirements. In accordance with the present invention the packing of the turbine shaft consists of a combination of divided carbon packing rings surrounded by springs or stretched wires placed around them, tapered ribs connected with the shaft and consisting of a metal having a coefficient of expansion similar to said shaft, and carbon insertions in the casing for coaction with said tapered ribs. The inner aperture of the carbon packing rings is of a diameter substantially equal to the diameter of the shaft at maximum temperature and therefore the rings contact with said shaft at said temperature, while packing at lower temperature is effected by means of the line packing formed by the annular ribs and their co-acting carbon insertions. This will insure, that the annular ribs, expanding to the same extent under the influence of the heat, as the shaft and the casing, shall perform a packing function merely by a slight contact with the carbon insertions at all pressures and temperatures, while the packing function under increasing expansion of the metal parts at rising temperature, will be effected by the carbon packing rings, due to the gradual diminution of the gaps between these non-expanding carbon rings and the shaft.

For the carbon-rings, carbon-ring spring-packing with their carbon portions pressing against the lateral walls or against a lateral wall of the packing chambers, may be advantageously employed. The tapered annular ribs for the line packing, may be suitably secured to the shaft and may run in annular grooves of the inner circumference of radial partitions lined with graphite carbon. The shaft may advantageously be provided with a sleeve composed of annular sections preferably consisting of high-grade hardened steel, some of which are provided with the annular tapered ribs, while the others form the surfaces for contact with the carbon rings. The plane packings, consisting of carbon rings, may be made to alternate with the line packings, formed in part by the annular ribs, and the casing may be provided for each turbine step with a number of chambers for the carbon rings and smaller chambers or guide grooves for the line packings. In view of the fact that the turbine casing, the stuffing box casing and the shaft are of iron or steel and possess the identical coefficient of expansion, and the guide faces or grooves of the ribs are carried by said casing, it is obvious that the shaft and the annular ribs connected therewith are subject to the same ratio of expansion as said guide faces or grooves. Moreover, in connection with a drop in temperature, the inner diameter of the guide faces or grooves decreases at the same ratio as the outer circumference of the annular ribs. For these reasons, the line packing will maintain tightness at all working temperatures by means of the slight contact between the knife-like annular ribs and the guide faces or grooves referred to. Any possible slight friction will be rendered innocuous by the transmission of heat to the shaft. If the grooves for the annular ribs be lined with graphite carbon material, the knife-like annular ribs during the trial run or first working of the turbine, automatically grind their guide faces to shape, while the axial motion of the annular ribs is also permitted, and the knife-like running edges of the ribs are not damaged due to the excellent gliding properties of the graphite carbon material.

The fine gap of the line packing formed in consequence of this arrangement is sufficiently narrow, so that even with a small number of annular ribs at the low steam pressure of not more than 2 atm. during the cruising period, a satisfactory packing will be attained. For the maximum pressure and the correspondingly high temperatures, this line packing will not alone suffice in view of the small number of annular ribs, and the plane packings, consisting of graphite carbon rings, then act in cooperation with the line packings formed by the annular ribs. By means of the combination of the two kinds of packing even with a small number of repetitions of this packing combination, it will be possible to completely neutralize the steam pressure. From this it may be seen that even in connection with a very much shorter stuffing box arrangement, an essentially improved packing will be produced, compared to the labyrinth packing and the usual carbon stuffing boxes.

In the accompanying drawings several examples of the packing in accordance with the present invention have been illustrated.

Fig. 1 represents one form of construction in vertical, longitudinal section, in which the annular ribs are integral with the turbine shaft.

Fig. 2 is a similar view of a form of construction in which the annular ribs are provided on a sleeve consisting of annular sections. In this figure the carbon packing rings have been removed and may be considered as identical with those shown in Fig. 1.

Fig. 3 is an enlarged sectional view of one of the U-shaped pressure rings shown in Fig. 2.

In Fig. 1, the turbine shaft 1 is provided with short annular ribs 2, possessing a tapered, circular edge 3. Within the casing 10, chambers 5, intended for the reception of the spring-carbon rings 7, are situated. In the represented example, the divided carbon rings 7 are each provided with an inclined outer face ascending toward the steam exhaust side and supporting a pressing ring 8, said ring 8 being divided into several segments radially held together by means of a wire 9 with a wave or spiral spring or in some other suitable way, so that the rings are pressed wedge-fashion against the partition toward the steam exhaust side. These partitions are provided with annular grooves 4, in which the knife-like edges 3 of the annular ribs 2 engage. The bottoms of these grooves 4 are undercut at 4' or recessed dovetail fashion, to receive linings 6 consisting of a carbon graphite material, this material being introduced into the grooves 4 with the aid of a suitable fixing agent, in the form of a liquid or pulp, after which it is fixed therein by subjecting it to a baking process, so that the lining cannot be removed from the groove. This lining mass may, for instance, consist of carbon, graphite and a liquid synthetic resin, which is solidified by heating.

The grooves 4 are of sufficient width to allow the knife-like annular ribs ample play in connection with the axial expansion of the shaft. In view of the fact, that the carbon linings are fixed and form a whole with the iron material of the stuffing box casing, the line contact between the edges 3 of the ribs 2 and the linings 6, produced by initial grinding-in, will remain in all temperature conditions. At the first start or during the trial run of the turbine, these knife-like edges 3 of the ribs 2, as soon as they establish contact with the carbon linings 6, cut or grind their paths of travel into the linings, without exercising in any way a deleterious influence upon the material of the ribs.

At the low cruising period of the turbine a gap of considerable width will show itself between the inner circumference of the carbon rings 7 and the external circumference of the shaft 2, in consequence of the fact that the carbon rings are of an internal diameter substantially the same as the diameter of the shaft at maximum temperature, but in spite thereof the few line packings where the edges 3 of the ribs 2 contact with the carbon linings 6 will suffice to produce a satisfactory packing in connection with a low steam pressure. At maximum temperature of the steam, however, the plane packings formed by the carbon rings 7, will snugly rest against the shaft and furnish a sufficient packing, in conjunction with which the line packings 3, 6 contribute to the reduction of leakage of steam pressure, because they interrupt the smooth axial passage of the steam in the unavoidable narrow gap between shaft and packing rings.

In Fig. 2, the shaft 11 is provided with a sleeve consisting of a plurality of ring-shaped sections 12, 13. The cylindrical surfaces of the ring-shaped sections 12 serve as bearing surfaces for the carbon packings situated in the spaces or chambers 16 of the casing 15. These carbon rings have been omitted in Fig. 2. The narrower ring-shaped sections 13 have been provided with ribs 14 received in the annular grooves 17 of the partitions of the casing. Also in this instance the grooves have been provided with bottoms 17' of dovetail shaped cross section, in which the graphite carbon linings 18 have been inserted. The ring-shaped sleeve sections particularly those 12 serving as bearing surfaces for the carbon rings, are advantageously made to consist of high-grade hardened steel. Owing to their smooth cylindrical form the surfaces of these sections 12 may be easily ground. In consequence of their considerable hardness they are of a much longer life than the non-hardened surfaces of the shaft and act in cooperation with the graphite carbon material without any considerable wear, while, on the other hand, by the employment of these ground and hardened sleeve sections 12, the wearing of the surface of the shaft has been avoided.

In order to firmly hold the rings together, they are firmly pressed against a thickened part 20 of the shaft by means of a nut 19 threaded onto the shaft. For the purpose of rendering it possible for the ring-shaped sections 12, 13 to expand in an axial direction, which expansion is essential because the core of the shaft toward the cooled bearings will have a lower temperature than the sleeve of the shaft, a compensation medium is provided, taking up the difference of expansion. This compensation medium consists in the example shown in the drawings, of a powerful annular spring 22, 23. Preferably, a spring of U-shaped cross section is employed, (see detail view, Fig. 3) the shanks 23 of which are tapered slightly toward the free end, while the point of bending 22 is thickened. The free ends of the shanks carry short, lateral flanges 24, 25 possessing plane bearing surfaces, by means of which they establish contact, on the one hand, with the nut 19 and, on the other hand, with the ring 21 of the sleeve of the shaft. A spring of this form is capable of taking up considerable pressures so that a firm seat of the sleeve sections on the shaft is insured. The spring may be of such dimensions that it will yield only to the extra-ordinarily great forces produced by the differences in temperature, but is of such rigidity, that it transfers the pressure of the nut 19 almost entirely upon the ring-shaped sleeve sections 12, 13.

The form of construction in accordance with Fig. 2 may also be applied to the shafts of old turbines already in existence, so as to employ the packing according to the present invention for the former.

I claim:

1. A packing for a high pressure variable temperature steam turbine having a rotary shaft and a fixed casing surrounding said shaft; said packing comprising spring-pressed carbon rings and graphite-carbon insertions, both secured in said casing and encircling the shaft, annular ribs rigidly connected with the shaft and having sharp circular outer edges contacting with said graphite-carbon insertions, said ribs consisting of a metal having a coefficient of heat-expansion similar to the shaft, the inner diameter of said spring-pressed carbon rings being equal to the diameter of the shaft at maximum temperature, the packing at low temperature being effected through the medium of said graphite-carbon insertions and said sharp edges of said ribs.

2. A packing for a high pressure variable temperature steam turbine having a rotary shaft and a fixed casing surrounding said shaft; said packing comprising spring-pressed carbon rings and graphite-carbon insertions, both secured in said casing and encircling the shaft, a sleeve secured around said shaft and composed of abutting annular sections of a metal having a coefficient of heat-expansion similar to the shaft, some of said sections being provided with annular ribs having sharp circular outer edges contacting with said graphite-carbon insertions, the others of said sections being plain and smooth and coacting with said spring-pressed carbon rings, the inner diameter of said spring-pressed rings being equal to the outer diameter of said plain smooth sections at maximum temperature, the packing at low temperature being effected through the medium of said graphite-carbon insertions and said sharp edges of said ribs.

3. A packing in accordance with claim 1; said casing having dove-tail-shaped annular grooves in which said graphite-carbon rings are held, said graphite-carbon rings consisting of a pulp-like mixture of graphite carbon with a liquid fixing agent adapted to be solidified by heating.

4. A packing in accordance with claim 1; said casing having dove-tail-shaped annular grooves in which said graphite-carbon rings are held, said graphite-carbon rings consisting of a pulp-like mixture of graphite-carbon with a liquid synthetic resin adapted to be solidified by heating.

5. A packing in accordance with claim 2; the shaft being further provided with an annular compensating means for allowing expansion of the sleeve in an axial direction, said compensating means consisting of an annular spring of U-shaped cross section, the shanks of which taper towards the free end, the point of bending being thickened.

GUSTAV HUHN.